UNITED STATES PATENT OFFICE.

GEORGE B. BURNHAM, OF BOROSOLVAY, CALIFORNIA.

PROCESS OF RECOVERING BORAX FROM SALINE WATERS.

1,328,614. Specification of Letters Patent. Patented Jan. 20, 1920.

No Drawing. Application filed June 30, 1919. Serial No. 307,750.

*To all whom it may concern:*

Be it known that I, GEORGE B. BURNHAM, a citizen of the United States, and a resident of Borosolvay, San Bernardino county, State of California, have invented a certain new and useful Process of Recovering Borax from Saline Waters, of which the following is a specification.

The invention relates to a process of recovering sodium tetraborate from saline waters containing the same, and particularly from the brines of the alkali lakes of the western United States.

An object of the invention is to provide a cheap process for recovering borax from saline waters containing the same.

The invention possesses other advantageous features, some of which, with the foregoing, will be set forth at length in the following description, where I shall outline in full, one form of the process of my invention. I shall describe the process as applied to the brine of Searles Lake in California but it is to be understood that the process is not limited to this particular brine.

Searles Lake brine contains sodium and potassium, chlorid, sulfate, carbonate, bicarbonate and borate. By the process of my invention, I am able to employ natural temperatures for evaporation and cooling, and I prefer to make use of the temperature variations of winter and summer and day and night, but artificial variations in temperature may be employed when desired.

In the preferred form of my process, the lake brine, which is at a temperature of from 22° C. to 25° C. the year round, is pumped, late in the fall of the year, into moderately shallow solar evaporation ponds, which I shall term the No. 1 ponds, and in these ponds some of the sulfates are crystallized out by cooling of the brine due to the temperatures prevailing at that time. The brine remains in these shallow ponds during November and part of December and the evaporation of the water during this time brings the concentration of the potash as high as is possible, consistent with the subsequent cooling that the brine will receive during the coldest part of winter.

During the cold nights of December and January, the brine is flowed from the No. 1 ponds into very shallow nightly cooling ponds (No. 2 ponds) which are about one inch deep, so that the brine will become thoroughly chilled. This extreme cooling causes carbonates, borates and more sulfates to crystallize out. In this way, by evaporating the brine slightly before extreme cooling, the potassium concentration in the brine will be as high as possible and the sulfate, carbonate and borate concentration will be as low as possible, consistent with the low nightly temperatures of winter.

In the coldest hours of the morning, the chilled brine is pumped from the shallow No. 2 ponds, into a deep pond (pond #3) in which the brine, on account of its depth, is not appreciably raised in temperature during the day. The agitation of the brine caused by pumping helps to crystallize out the sodium sulfates, carbonates and borates with which the brine is inclined to be supersaturated at the cold temperatures of the morning. The sodium sulfate and carbonate salts tend to crystallize out more rapidly than the borax and settle to the bottom of the deep pond #3 in a few hours. The brine is then pumped from deep pond #3 to another deep pond #4, to separate the deposited crystals from the brine. In deep pond #4, the brine retains its low temperature for several days and during this time, the borax ($Na_2B_4O_7.10H_2O$) slowly crystallizes out and settles to the bottom of the pond.

The brine is then pumped or flowed into a summer evaporating pond #5 to separate it from the deposited borax and the brine is then treated to recover potash, as set forth in my United States Patent No. 1,286,932. The deposited borax is removed from pond #4 and filtered to remove the adhering mother liquor from the crystals. The crystals thus obtained may be refined in any desirable manner.

In some instances, depending upon temperature conditions, the brine may be flowed from the deep #4 pond into the shallow #2 ponds and the process repeated through ponds #3 and #4 and the brine delivered to pond #5. The above method of recovering borax does not require any concentration of the brine in borax. The slight evaporation that takes place late in the fall or in the winter does not concentrate the borax because the cold weather causes small amounts thereof to crystallize out in pond #1 with the sulfates. By this process a good grade of borax is obtained directly from Searles Lake brine by cooling. The recovery of borax from natural solutions of mixed salts, or solutions made up by dissolving natural deposits in water, has hitherto been effected by concentrating the solution at a high temperature. In the presence of carbonates at high temperatures, boric acid, or any of its less soluble salts, such as sodium tetraborate, react with the carbonates to form sodium metaborate and liberate carbon dioxid. Upon concentrating and cooling, sodium metaborate crystallizes out.

Instead of concentrating at high temperatures, I employ low temperatures, without necessary concentration. Thus, in such cases as with Searles Lake, I not only eliminate the necessity of preliminary concentration of the borax, but I also prevent the formation of sodium metaborate. The slow rate at which the borax settles out of solution is due either to the fact that it crystallizes out slowly or crystallizes out in such minute crystals that they settle out of solution very slowly, and is probably the result of both. The slow deposition of the borax crystals, however, provides a simple and effective means of separating the borax from the carbonates and sulfates.

I claim:

1. The process of recovering borax from liquors containing sodium sulfate, carbonate and borate, which consists in cooling the liquor to crystallize out sodium sulfate and sodium carbonate, removing the cold liquor from the deposited crystals and maintaining the liquor cold, whereby borax crystals are deposited.

2. The process of recovering borax from liquors containing sodium sulfate, carbonate and borate, which consists in cooling the liquor to a temperature sufficiently low to crystallize out sodium sulfate, carbonate and borate, permitting the crystals of sodium sulfate and carbonate to deposit, removing the cold liquor from the deposited crystals within a few hours after the deposition of the crystals is begun and maintaining the liquor cold for several days whereby borax is deposited.

3. The process of recovering borax from liquors containing sodium chlorid, sulfate, carbonate and borate, which consists in cooling the liquor to a temperature sufficiently low to crystallize out sodium sulfate, carbonate and borate, agitating the liquor to crystallize out sodium sulfate and carbonate, removing the liquor from deposited crystals and maintaining the removed liquor cold to cause a deposition of borax crystals.

4. The process of recovering sodium tetraborate from liquors containing the same and other salts, which consists in cooling the liquor to crystallize out a portion of the other salts, removing the cold liquor from the deposited salts and maintaining the liquor at approximately the same temperature, whereby sodium tetraborate crystals are deposited.

5. The process of recovering sodium tetraborate from liquors containing sodium carbonates and tetraborates, which consists in evaporating the liquor at a temperature which prevents the decomposition of the tetraborates, cooling the liquor to crystallize out sodium carbonates, removing the cold liquor from the deposited crystals and maintaining the liquor at approximately the same temperature, whereby sodium tetraborate crystals are deposited.

6. The process of recovering borax from liquors containing sodium sulfates and borates, which consists in cooling the liquor by exposing the liquid in a large shallow body to the air on cold winter nights, flowing the liquor, while cold, into a compact volume to retain its low temperature whereby sodium sulfate is crystallized out, removing the liquor from the deposited crystals and settling out borax from the removed liquor.

In testimony whereof I have hereunto set my hand at San Francisco, California, this 9th day of June, 1919.

GEORGE B. BURNHAM.

In presence of—
H. G. PROST.